(12) United States Patent
Miyamoto

(10) Patent No.: US 6,816,393 B2
(45) Date of Patent: Nov. 9, 2004

(54) SWITCHING POWER SUPPLY

(75) Inventor: Hitoshi Miyamoto, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 36 days.

(21) Appl. No.: 10/408,137

(22) Filed: Apr. 7, 2003

(65) Prior Publication Data

US 2004/0076021 A1 Apr. 22, 2004

(30) Foreign Application Priority Data

Apr. 9, 2002 (JP) .................................. 2002-001963 U

(51) Int. Cl.[7] .................................................. H02M 3/335
(52) U.S. Cl. .................................. 363/21.17; 363/21.4
(58) Field of Search ........................... 363/16, 19, 20, 363/21.4, 21.7, 21.17, 21.8, 97, 131; 307/157, 66

(56) References Cited

U.S. PATENT DOCUMENTS 4,150,417 A * 4/1979 Darrow et al. ............... 361/198

FOREIGN PATENT DOCUMENTS

| JP | 9-266669 | 10/1997 | ............ H02M/3/28 |
| JP | 11-149320 | 6/1999 | ............ G05F/1/10 |

* cited by examiner

*Primary Examiner*—Rajnikant B. Patel
(74) *Attorney, Agent, or Firm*—Osha & May L.L.P.

(57) ABSTRACT

There is provided with a breaking resistor R6 inserted at an arbitrary portion of a current path from the output point 21 of a primary side positive power supply IN+ to the drain of an FET 5. Supposing that a value obtained by dividing a resistance value by a rated watt is a broken index, the broken index of the breaking resistor R6 is set to be larger than that of a current detection resistor R1.

3 Claims, 2 Drawing Sheets

SWITCHING POWER SUPPLY

BACKGROUND OF THE INVENTION

The present invention relates to a switching power supply wherein a current detection resistor is inserted between a switching element such as an FET and a primary side ground level and a current flowing into the switching element is limited based on a voltage generated between the both terminals of the current detection resistor.

In an RCC type switching power supply, the configuration shown in FIG. 2 is proposed as a conventional technique which can prevent abnormal heat etc. even in the case of the short-circuit of a primary coil or a switching element. That is, supposing that a zener diode D5 is eliminated, when a short-circuit of a primary coil L1 or an internal short-circuit of an FET 5 occurs, an over-current flows through a current detection resistor R1. This over-current causes an open breakage of the current detection resistor R1 before fusing of a fuse 3. When the open breakage of the current detection resistor R1 occurs, a high voltage exceeding 100 volt is applied to the base of a control transistor Q2 through a diode D1. As a result, abnormal heat occurs at the control transistor Q2 and so a firing may occur before melting of the fuse 3.

Thus, although it is desirable to use as the current detection resistor R1 a cemented resistor which is quite low in possibility of causing the open breakage, the cemented resistor is expensive. Therefore, conventionally, a metal film resistor which element cost is cheap is used as the current detection resistor R1, and the zener diode D5 is connected in parallel with the current detection resistor R1. In this case, even if the primary coil L1 or the zener diode D5 is short-circuited and the open breakage of the current detection resistor R1 occurs, the base voltage of the control transistor Q2 is limited to the zener voltage of the zener diode D5. Thus, the abnormal heat of the control transistor Q2 is suppressed. Therefore, since the fuse 3 melts before the breakage of the zener diode D5, the heat generation is stopped thereafter (first conventional technique).

Further, in a switching power supply, a technique for preventing the breakage etc. of a load caused by an over-voltage is proposed in the Unexamined Japanese Patent Application Publication No. Hei11-149320. That is, in this technique, an over-current fusing type resistor is inserted between a primary side positive power supply and a switching element. A thyristor is provided whose one end is coupled at a connection point between the switching element and the over-current fusing type resistor and the other terminal is grounded. Further, an over-voltage detection circuit is provided which shifts the thyristor from an off state to an on state when an output voltage exceeds a predetermined value. Thus, when the output voltage increases to an abnormal voltage due to an abnormality of the switching element etc., the thyristor becomes in an on state. As a result, the output voltage reduces to almost 0 volt. Further, a current sufficient for fusing flows through the over-current fusing type resistor. Thus, when the output voltage becomes a high value due to an abnormality of the switching element etc., since the over-current fusing type resistor fuses in a short time, a load is protected from the breakage due to an over-voltage (second conventional technique).

In a technique proposed in the Unexamined Japanese Patent Application Publication No. Hei9-266669, a fuse resistor is provided independently from a smoothing circuit constituted by a resistor and a smoothing capacitor. One terminal of the fuse resistor is coupled to the smoothing circuit and the other terminal thereof is coupled to a primary coil. Thus, a rush current to the smoothing capacitor at the time of turning-on of the power supply does not flow into the fuse resistor. That is, there is no fear that the fuse resistor melts by the rush current. Therefore, the fusing current value of the fuse resistor may be set to a value necessary for the protection of the load without taking the influence of the rush current into consideration, the reliability with respect to the protection for the load can be improved (third conventional technique).

However, when the first conventional technique is employed, the zener diode D5 is required. Further, the zener diode D5 is required to have a durability sufficient for not causing the breakage of the element itself until the fuse 3 melts. Thus, since the zener diode D5 is required to be an element with a large rated watt, the zener diode D5 is expensive.

When considering the second conventional technique in a view point of eliminating the problem of the first conventional technique, that is, when considering the second conventional technique in a view point of preventing without using an expensive element the generation of the abnormal heat at the time of the open breakage of the current detection resistor R1 coupled between the source of the FET 5 and the primary side ground level, this technique is difficult to be applied to the switching power supply even only in a view point of using the fuse resistor since the fuse resistor is an expensive element. Further, since the thyristor is required to be provided additionally, the cost of the parts for the switching power supply increases further.

The third conventional technique is formed to have a circuit configuration intended not to flow the rush current into the fuse resistor. That is, when considering the third conventional technique in a view point of eliminating the problem of the first conventional technique, since the third conventional technique differs in the basic configuration of the switching power supply, the third conventional technique can not prevent the generation of the abnormal heat at the time of the open breakage of the current detection resistor R1 coupled between the source of the FET 5 and the primary side ground level. Further, the third conventional technique is arranged to protect the load based on the rated power ratio of the resistor itself which is configured to easily case the open-breakage thereof.

SUMMARY OF THE INVENTION

The invention is made in order to solve the aforesaid problems of the conventional techniques an object of the invention is to provide a switching power supply which can prevent abnormal heat of a control transistor at the time of the short-circuit of a primary winding or an FET without using a zener diode which is an expensive element by differentiating the current values from which two resistors start the open-breakage, respectively; which can easily determine resistance values and rated watts of respective resistors used as a breaking resistor and a current detection resistor which are inserted in a path from the output point of a primary side positive power supply to the drain of the FET; and which can suppress the dissipation power of the breaking resistor to a minimum value even when surely causing the open-breakage of the breaking resistor without causing the open-breakage of the current detection resistor.

Further, another object of the invention is to provide a switching power supply wherein the breaking resistor is inserted at an arbitrary portion of the path from the output point of the primary side positive power supply to the drain of the FET and the breaking resistor is set to be open-broken more easily than the current detection resistor based on the relation of the resistance values and the rated watts between the breaking resistor and the current detection resistor, whereby abnormal heat of the control transistor can be prevented at the time of the short-circuit of the primary coil or the FET without using a zener diode which is an expensive element.

Furthermore, in addition to the aforesaid objects, still another object of the invention is to provide a switching power supply which can easily determine resistance values and rated watts of respective resistors used as the breaking resistor and the current detection resistor by forming each of the breaking resistor and the current detection resistor by a metal film resistor.

In order to solve the aforesaid problems, the switching power supply according to the invention is arranged in a manner that in the switching power supply including:
  a transformer around which a primary coil and a secondary coil are wound, one terminal of the primary coil being introduced to a primary side positive power supply;
  a switching element having a current input terminal coupled to other terminal of the primary coil and a current output terminal coupled to a primary side ground level through a current detection resistor;
  a control transistor having a base coupled to the current output terminal, a collector coupled to a control terminal of the switching element and an emitter coupled to the primary side ground level; and
  an error detection circuit for detecting an error voltage of a DC output obtained by rectifying and smoothing an output of the secondary coil, wherein
    the control transistor controls a switching operation of the switching element based on the error voltage thereby to stabilize a voltage of the DC output and limits a current flowing into the switching element within a predetermined range of value based on a voltage between both terminals of the current detection resistor, the switching power supply is arranged in that
      when a value obtained by dividing a resistance value by a rated watt is defined as a broken index,
    a breaking resistor is inserted at an arbitrary portion of a current path from an output point of the primary side positive power supply to the current input terminal,
    a broken index of the breaking resistor is set in a range of two times to four times as large as a broken index of the current detection resistor, and
    each of the breaking resistor and the current detection resistor is formed by a metal film resistor.

That is, a current of the same value always flows through the breaking resistor and the current detection resistor. Further, the broken index represents a degree how a resistor likely open-broken when an over-current flows through the resistor. Thus, when a short-circuit occurs at the primary coil or the switching element and so an over-current flows into both the breaking resistor and the current detection resistor, the open-breakage occurs at the breaking resistor side but does not occur at the current detection resistor side. Further, since each of the breaking resistor and the current detection resistor is the same kind of resistor, when an over-current of the same value flows into these resistors, the resistor with a larger broken index is necessarily open-broken. Thus, the resistance value and the rated watt of each of the breaking resistor and the current detection resistor are determined so that a broken index of the breaking resistor becomes larger than that of the current detection resistor. Further, when a broken index of the breaking resistor is set in a range of two times to four times as large as that of the current detection resistor, since the resistance value of the breaking resistor does not become too large, the dissipation power of the breaking resistor can be suppressed to a small value.

The switching power supply according to the invention is arranged in a manner that in the switching power supply including:
  a transformer around which a primary coil and a secondary coil are wound, one terminal of the primary coil being introduced to a primary side positive power supply;
  a switching element having a current input terminal coupled to other terminal of the primary coil and a current output terminal coupled to a primary side ground level through a current detection resistor;
  a control transistor having a base coupled to the current output terminal, a collector coupled to a control terminal of the switching element and an emitter coupled to the primary side ground level; and
  an error detection circuit for detecting an error voltage of a DC output obtained by rectifying and smoothing an output of the secondary coil, wherein
    the control transistor controls a switching operation of the switching element based on the error voltage thereby to stabilize a voltage of the DC output and limits a current flowing into the switching element within a predetermined range of value based on a voltage between both terminals of the current detection resistor, the switching power supply is arranged in that
      when a value obtained by dividing a resistance value by a rated watt is defined as a broken index,
    a breaking resistor is inserted at an arbitrary portion of a current path from an output point of the primary side positive power supply to the current input terminal, and
    a broken index of the breaking resistor is set to be larger than a broken index of the current detection resistor.

That is, a current of the same value always flows through the breaking resistor and the current detection resistor. Further, the broken index represents a degree how a resistor likely open-broken when an over-current flows through the resistor. Thus, when a short-circuit occurs at the primary coil or the switching element and so an over-current flows into both the breaking resistor and the current detection resistor, the open-breakage occurs at the breaking resistor side but does not occur at the current detection resistor side.

In addition to the aforesaid configuration, each of the breaking resistor and the current detection resistor is formed by a metal film resistor. That is, since each of the breaking resistor and the current detection resistor is the same kind of the resistor, when an over-current of the same value flows into these resistors, the resistor with a larger broken index is necessarily open-broken. Thus, the resistance value and the rated watt of each of the breaking resistor and the current detection resistor are determined so that a broken index of the breaking resistor becomes larger than that of the current detection resistor.

DETAILED DESCRIPTION OF THE PREFERRED EMBODIMENTS

The embodiment of the invention will be explained with reference to the accompanying drawings.

Figure 1:
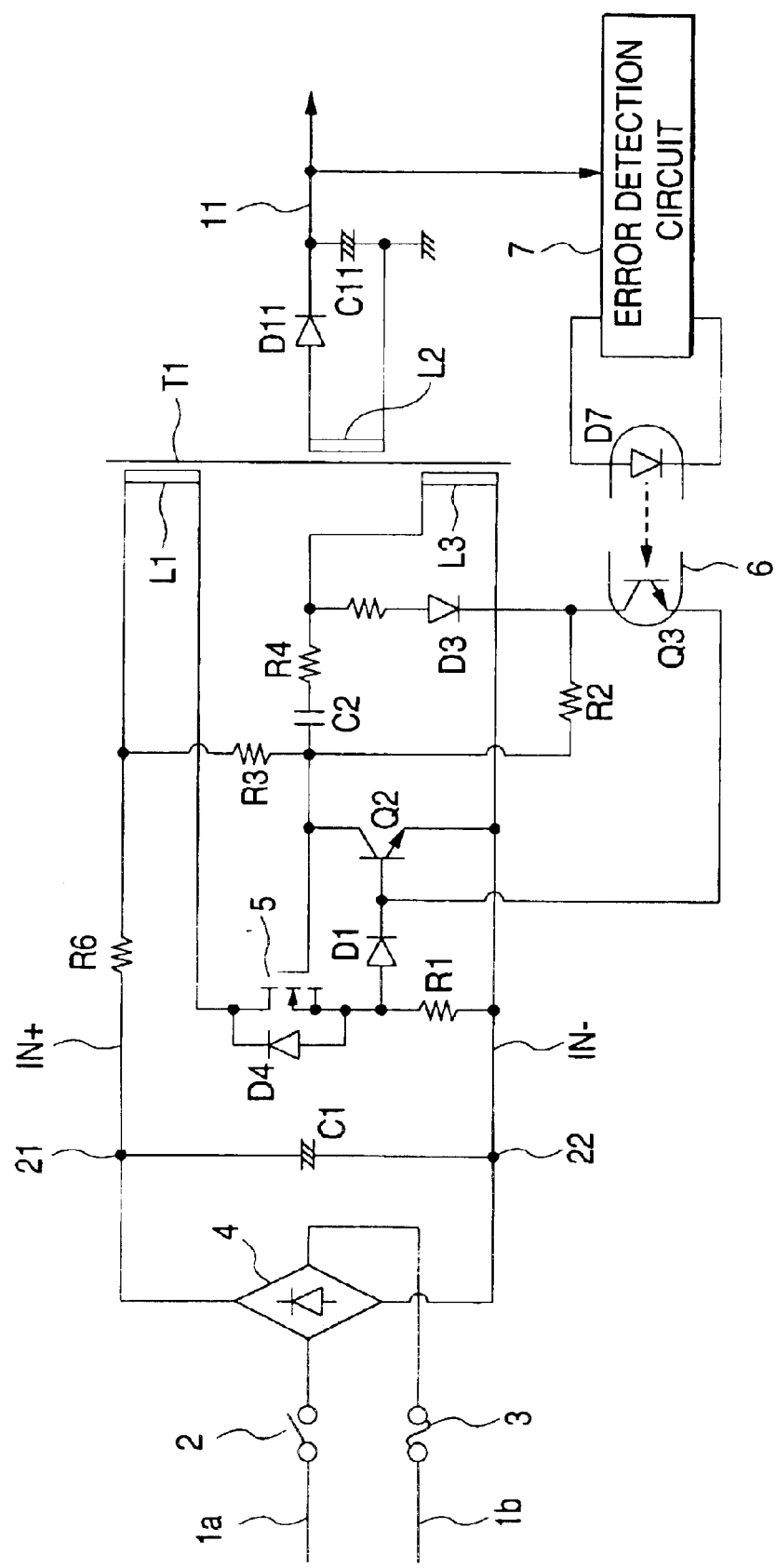
FIG. 1 is a circuit diagram showing the electrical connection of an embodiment of a switching power supply according to the invention.
Figure 2:
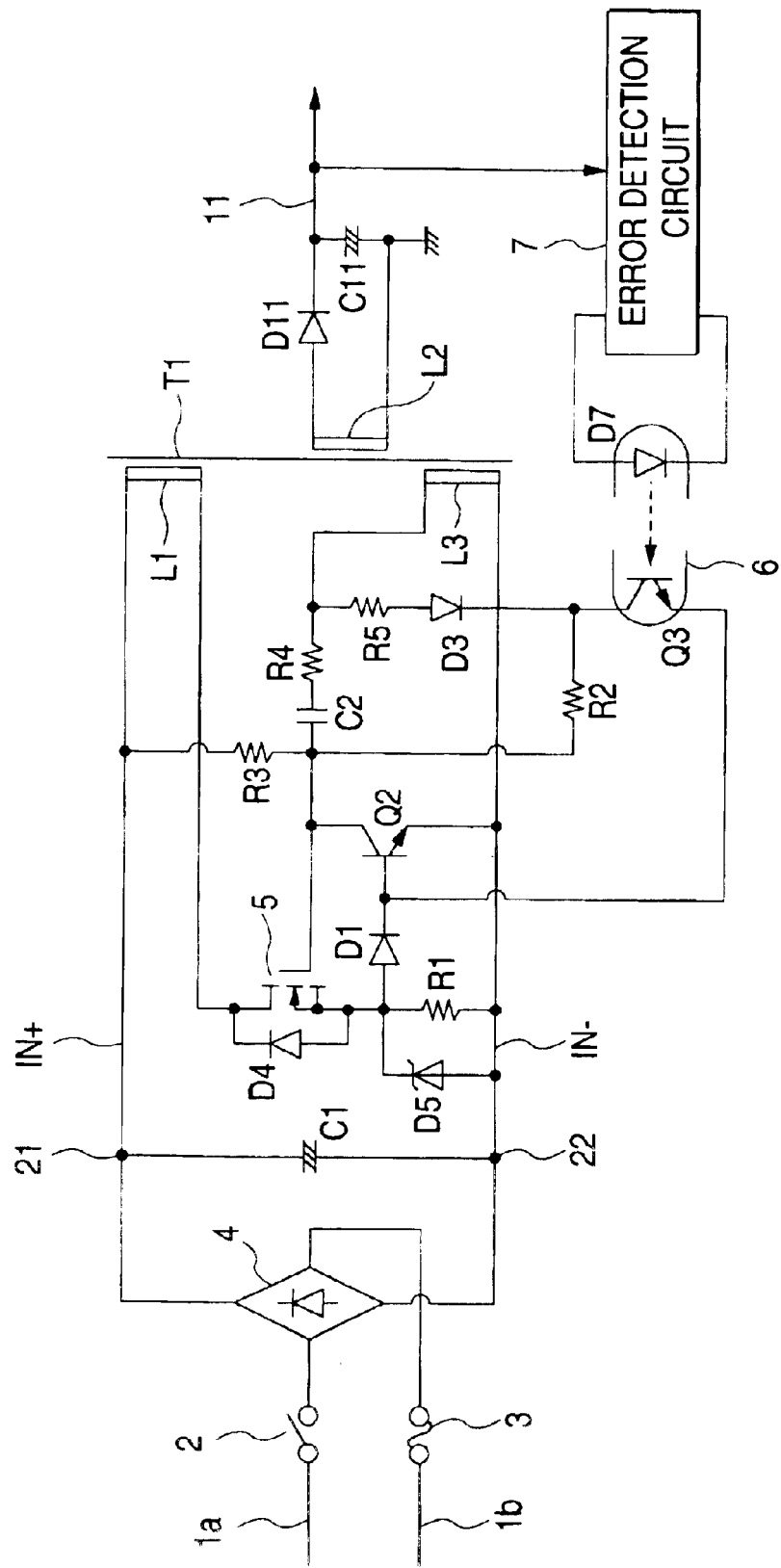
FIG. 2 is a circuit diagram showing the electrical connection of a conventional technique.

FIG. 1 is a circuit diagram showing the electric connection of the embodiment of an RCC type switching power supply according to the invention, in which portions identical to those of FIG. 2 are referred to by the common symbols in FIG. 1.

One line 1a of the commercial power supply is introduced to one of AC input terminals of a diode bridge 4 through a power supply switch 2. The other line 1b of the commercial power supply is introduced to the other of the AC input terminals of the diode bridge 4 through a fuse 3. The positive terminal side output of the diode bridge 4 is coupled to the positive terminal 21 of a smoothing capacitor C1, whilst the negative terminal side output of the diode bridge 4 is coupled to the negative terminal 22 of the smoothing capacitor C1. A path from the positive terminal (the output point of the primary side positive power supply recited in claims) 21 of the smoothing capacitor C1 serves as a primary side positive power supply IN+ and is coupled to one terminal of a primary coil L1 wound around a transformer T1 through a breaking resistor R6. Further, a path from the negative terminal 22 of the smoothing capacitor C1 serves as a primary side ground level IN−.

An FET 5 serves as a switching element for switching a current flowing through the primary coil L1 wound around the transformer T1. Thus, the drain (a current input terminal) of the FET 5 is coupled to the other terminal of the primary coil L1. The current detection resistor R1 serves as an element for detecting a current flowing through the FET 5. To this end, the current detection resistor R1 is coupled between the source (a current output terminal) of the FET 5 and the primary side ground level IN−. A resistor R3 serves as an element for applying a start voltage to the gate (a control terminal) of the FET 5 upon the turning-on of the power supply. To this end, the resistor R3 is coupled between the primary side positive power supply IN+ and the gate of the FET 5.

A series circuit formed by a capacitor C2 and a resistor R4 serves as a path for introducing a voltage generated at a drive coil L3 to the FET 5. To this end, one of the terminals of the capacitor C2 is coupled to the gate of the FET 5. The other terminal of the capacitor C2 is coupled to one terminal of the resistor R4, whilst the other terminal of the resistor R4 is coupled to one terminal of the drive coil L3. The other terminal of the drive coil L3 is coupled to the primary side ground level IN−.

A control transistor Q2 detects a current flowing through the FET 5 upon the turning-on of the power supply based on a voltage between the both terminals of the current detection resistor R1. When the detected current exceeds a predetermined value, the control transistor serves to reduce the gate voltage of the FET 5 thereby to limit the current flowing into the FET 5. Further, the control transistor Q2 controls the switching operation of the FET 5 based on the error voltage of a DC output 11 detected by an error detection circuit 7 and fed back through a photo coupler 6 thereby to stabilize the DC output 11 to a voltage of 5 volt, for example.

To this end, the collector of the control transistor Q2 is coupled to the gate of the FET 5, whilst the emitter of the control transistor Q2 is coupled to the primary side ground level IN−. The anode of the diode D1 is coupled to the source of the FET 5, and the cathode of the diode D1 is introduced to the base of the control transistor Q2. Further, the emitter of a photo transistor Q3 is coupled to the base of the control transistor Q2.

A series circuit formed by a resistor R5 and a diode D3 connected in series serves as a path for applying a positive voltage generated at the one terminal of the drive coil L3 at the time of the turning-on of the FET 5 to the collector of the photo transistor Q3. To this end, the series circuit formed by the resistor R5 and the diode D3 is coupled between the one terminal of the drive coil L3 and the collector of the photo transistor Q3.

A resistor R2 serves as an element which applies a voltage, for enabling the error voltage to be fed back to the primary side, to the collector of the photo transistor Q3 even when the voltage at the one terminal of the drive coil L3 reduces in the turning-on state of the FET 5. To this end, the resistor R2 is coupled between the resistor R3 and the collector of the photo transistor Q3.

Incidentally, a diode D4 which cathode and anode are respectively coupled to the drain and the source of the FET 5 is an element incorporated within the FET 5 and serves as an element forming a current path from the source side to the drain side of the FET in the turning-off state of the FET 5. Each of the breaking resistor R6 and the current detection resistor R1 is formed by a metal film resistor.

The error detection circuit 7 is formed by a block provided with a shunt regulator having a voltage detection terminal, a voltage dividing circuit etc. The error detection circuit detects an error voltage of the DC output 11 and drives the light emitting diode D7 of the photo coupler 6 by a current (an error signal) corresponding to the error voltage thus detected thereby to feed back the error voltage of the DC output 11 to the primary side. The DC output 11, which is obtained by rectifying and smoothing the output of a secondary coil L2 by a diode D11 and a smoothing capacitor C11, is supplied to a microcomputer etc. constituting a controller, for example, when this embodiment is applied to a television receiver.

Not-shown another secondary coil is also wound around the transformer T1. The outputs of these secondary coils are also rectified and smoothed and supplied to a corresponding circuit block as an operation power supply. Thus, the total electric power of the secondary side output is about 20 watt.

When a failure does not occur in the embodiment thus configured, the control transistor Q2 controls the switching operation of the FET 5 based on the error voltage introduced through the photo coupler 6. Therefore, the voltage of the DC output 11 is stabilized to 5 volt.

In the embodiment configured in the aforesaid manner, the explanation will be made as to the breaking resistor R6 when a failure occurs in the primary coil L1 or the FET 5.

When a failure occurs in the primary coil L1 or the FET 5, a large quantity of electric charges accumulated in the smoothing capacitor C1 is discharged. Thus, since a value of a current flowing through the fuse 3 becomes smaller than a value of a current flowing through the primary side ground level IN−, a melting operation of the fuse 3 is delayed. On the other hand, when the open-breakage of the current detection resistor R1 occurs before the melting of the fuse 3 or the open-breakage of the breaking resistor R6, an over-current flows into the control transistor Q2. Then, when the over-current flows into the control transistor Q2, abnormal heat is generated at the control transistor Q2 and so the control transistor may be fired.

However, when the open-breakage of the breaking resistor R6 is caused before the open-breakage of the current detection resistor R1 even when the short-circuit of the primary coil L1 or the FET 5 occurs, an over-current is prevented from flowing through the control transistor Q2. That is, when the open-breakage of the breaking resistor R6 is caused before the open-breakage of the current detection resistor R1, a fear of the occurrence of firing can be eliminated.

Hereinafter, the explanation will be made as to a condition necessary for causing the open-breakage of the breaking resistor R6 before the open-breakage of the current detection resistor R1.

As to two resistors of the same type, the explanation will be made as to a value obtained by dividing a resistance value by a rated watt (hereinafter called a broken index) When a flowing current is constant, an exothermic value becomes larger as a resistance value is larger. On the other hand, supposing that the exothermic value is constant, the smaller the rated watt is, more easily the open-breakage occurs. Thus, when the two resistors are connected in series and an over-current is flown therethrough, the open-breakage occurs at the resistor with a larger broken index. Further, the larger a ratio between the broken indices of the two resistors becomes, the more likely the open-breakage occurs at the resistor with a larger broken index.

On the other hand, the value of the current detection resistor R1 I is uniquely determined based on a current value allowed to the FET 5. Further, as the value of the breaking resistor R6 becomes larger, the dissipation power thereof at the time of a normal operation increases. Thus, it is desirable to make the value of the breaking resistor R6 small.

As described above, according to the embodiment, the value of the breaking resistor R6 is 2.7 Ω and a rated watt thereof is 1 watt. Further, the value of the current detection resistor R1 is 1.2 Ω and a rated watt thereof is 1 watt. That is, the broken index of the breaking resistor R6 is 2.7 and the broken index of the current detection resistor R1 is 1.2. In other words, a ratio between the broken indices of these resistors is about 2.3.

Thus, when a short-circuit occurs at the primary coil L1 or the FET 5 and an over-current flows in a path from the primary side positive power supply IN+ to the primary side ground level IN−, the open-breakage of the breaking resistor R6 occurs surely before the open-breakage of the current detection resistor R1. Thus, an over-current is prevented from flowing through the control transistor Q2.

When the switching power supply is configured to output a power on the secondary side in a range of 50 to 80 watt, a metal film resistor with a resistance value in a range of 0.33 to 0.47 Ω and a rated watt of 2 watt is used as the current detection resistor R1 and a metal film resistor with a resistance value in a range of 0.47 to 0.51 Ω and a rated watt of 1 watt is used as the breaking resistor R6 so as to suppress the increase of the dissipation power of the breaking resistor.

Incidentally, the resistance values and the rated watts of the breaking resistor R6 and the current detection resistor R1 are not limited to the aforesaid embodiment. That is, as to the resistance values, when the value of the breaking resistor R6 is set in a range of one time to three times as large as the value of the current detection resistor R1 and the broken index of the breaking resistor is set in a range of two times to four times as large as that of the current detection resistor, the action similar to the aforesaid embodiment can be obtained while suppressing the dissipation power of the breaking resistor R6 to a small value.

Supplemental explanation will be made that the minimum value of the rated watt of the metal film resistor is 1 watt. Thus, when the rated watt of the resistor used in the current detection resistor is set to 1 watt, the resistance value of the breaking resistor is required to be larger in order to make the broken index of the breaking resistor larger. However, when the resistance value of the breaking resistor is made large, the dissipation power of the breaking resistor increases and so the switching efficiency is degraded. Thus, the broken index of the breaking resistor is desirable to be set in a range of two times to four times as large as that of the current detection resistor.

When a resistor with a rated watt of 2 watt is used as the current detection resistor, a resistor with a rated watt of 1 watt may be used as the breaking resistor. However, in this case, also, the broken index of the breaking resistor is desirable to be set in a range of two times to four times as large as that of the current detection resistor in order to suppress the dissipation power of the breaking resistor.

Incidentally, the invention is not limited to the aforesaid embodiment. That is, although the explanation is made as to the case where the breaking resistor R6 is inserted in the path form the positive terminal 21 of the smoothing capacitor C1 to the one terminal of the primary coil L1, the invention may be applied to a case where the breaking resistor may be inserted in the path from the other terminal of the primary coil L1 to the drain of the FET 5.

Further, although the explanation is made as to the case where the FET 5 is used as the switching element, the invention may be applied to a case where a bipolar transistor is used as the switching element (in this case, a collector, an emitter and a base thereof serve as the current input terminal, the current output terminal and the control terminal, respectively).

Furthermore, although the explanation is made as to the case where the invention is applied to the RCC type switching power supply, the invention can also be applied to a PWM type switching power supply in the similar manner.

As described above, according to the invention, when a value obtained by dividing a resistance value by a rated watt is defined as the broken index, the breaking resistor is inserted at an arbitrary portion of the current path from the output point of the primary side positive power supply to the current input terminal, a broken index of the breaking resistor is set in a range of two times to four times as large as that of the current detection resistor, and each of the breaking resistor and the current detection resistor is formed by a metal film resistor. Thus, an over-current flows into both the breaking resistor and the current detection resistor, the open-breakage occurs surely at the breaking resistor side but does not occur at the current detection resistor side. Further, since the resistance value of the breaking resistor does not become too large, the dissipation power of the breaking resistor can be suppressed to a small value. Thus, abnormal heat of the control transistor at the time of the short-circuit of the primary winding or the FET can be prevented without using a zener diode which is an expensive element. Further, the resistance values and the rated watts of the resistors used as the breaking resistor and the current detection resistor can be determined easily. Furthermore, the dissipation power of the breaking resistor can be suppressed to a small value even when surely causing the open-breakage of the breaking resistor without casing the open-breakage of the current detection resistor.

Further, according to the invention, the breaking resistor is inserted at an arbitrary portion of the current path from the output point of the primary side positive power supply to the current input terminal, when a value obtained by dividing a resistance value by a rated watt is defined as a broken index, a broken index of the breaking resistor is set to be larger than that of the current detection resistor. Thus, when a short-circuit occurs at the primary coil or the switching element and so an over-current flows into both the breaking resistor and the current detection resistor, the open-breakage occurs at the breaking resistor side but does not occur at the current detection resistor side. Therefore, abnormal heat of the control transistor at the time of the short-circuit of the primary winding or the FET can be prevented without using a zener diode which is an expensive element.

Further, each of the breaking resistor and the current detection resistor is formed by a metal film resistor. Thus, when an over-current of the same value flows into these resistors, the resistor with a larger broken index is necessarily open-broken. Therefore, since the resistance value and the rated watt of each of the breaking resistor and the current detection resistor are determined so that a broken index of the breaking resistor becomes larger than that of the current detection resistor, the resistance value and the rated watt of each of resistors used as the breaking resistor and the current detection resistor can be determined easily.

What is claimed is:

1. A switching power supply comprising:
   a transformer around which a primary coil and a secondary coil are wound, one terminal of said primary coil being introduced to a primary side positive power supply;
   a switching element having a current input terminal coupled to other terminal of said primary coil and a current output terminal coupled to a primary side ground level through a current detection resistor;
   a control transistor having a base coupled to said current output terminal, a collector coupled to a control terminal of said switching element and an emitter coupled to the primary side ground level;
   an error detection circuit for detecting an error voltage of a DC output obtained by rectifying and smoothing an output of said secondary coil; and
   a breaking resistor inserted at an arbitrary portion of a current path from an output point of the primary side positive power supply to said current input terminal, wherein
   said control transistor controls a switching operation of said switching element based on the error voltage to stabilize a voltage of the DC output and limits a current flowing into said switching element within a predetermined range of value based on a voltage between both terminals of said current detection resistor,
   when a value obtained by dividing a resistance value by a rated watt is defined as a broken index,
   a broken index of said breaking resistor is set in a range of two times to four times as large as a broken index of said current detection resistor, and
   each of said breaking resistor and said current detection resistor is formed by a metal film resistor.

2. A switching power supply comprising:
   a transformer around which a primary coil and a secondary coil are wound, one terminal of said primary coil being introduced to a primary side positive power supply;
   a switching element having a current input terminal coupled to other terminal of said primary coil and a current output terminal coupled to a primary side ground level through a current detection resistor;
   a control transistor having a base coupled to said current output terminal, a collector coupled to a control terminal of said switching element and an emitter coupled to the primary side ground level;
   an error detection circuit for detecting an error voltage of a DC output obtained by rectifying and smoothing an output of said secondary coil; and
   a breaking resistor inserted at an arbitrary portion of a current path from an output point of the primary side positive power supply to said current input terminal, wherein
   said control transistor controls a switching operation of said switching element based on the error voltage to stabilize a voltage of the DC output and limits a current flowing into said switching element within a predetermined range of value based on a voltage between both terminals of said current detection resistor,
   when a value obtained by dividing a resistance value by a rated watt is defined as a broken index,
   a broken index of said breaking resistor is set to be larger than a broken index of said current detection resistor.

3. The a switching power supply according to the claim 2, wherein
   each of said breaking resistor and said current detection resistor is formed by a metal film resistor.

* * * * *